United States Patent [19]

Rethwish

[11] 3,995,528
[45] Dec. 7, 1976

[54] TOOL LENGTH COMPENSATOR FOR NUMERICALLY CONTROLLED MACHINE

[75] Inventor: William F. Rethwish, Bonita, Calif.
[73] Assignee: Rohr Industries, Inc., Chula Vista, Calif.
[22] Filed: Aug. 25, 1975
[21] Appl. No.: 607,281
[52] U.S. Cl. .................. 90/11 E; 33/174 PC; 318/468
[51] Int. Cl.² ................................. B23C 1/16
[58] Field of Search .......... 90/11 E, 13 C; 318/466, 318/467, 468, 626; 408/3; 29/568; 33/174 PC, 185 R

[56] References Cited
UNITED STATES PATENTS

| | | | |
|---|---|---|---|
| 3,481,247 | 12/1969 | Hayes | 33/185 X |
| 3,636,814 | 1/1972 | Esch | 90/11 E |
| 3,684,939 | 8/1972 | Perry | 318/468 |

Primary Examiner—Gil Weidenfeld
Attorney, Agent, or Firm—Patrick J. Schlesinger

[57] ABSTRACT

An annular frame having a biased target plate thereon is mounted in a selected path of advance of each of the usual plurality of tools of a N.C. machine. Two micro-switches are mounted for operation in sequence upon selected movement of the target plate by each advancing tool. Actuation of the first of these micro-switches slows the advance of the tool, while actuation of the second arrests tool advance and notifies the computer of the N.C. machine that such tool is then in a selected, zero position, from which position all further computer controlled operations of the tool are programmed.

12 Claims, 6 Drawing Figures

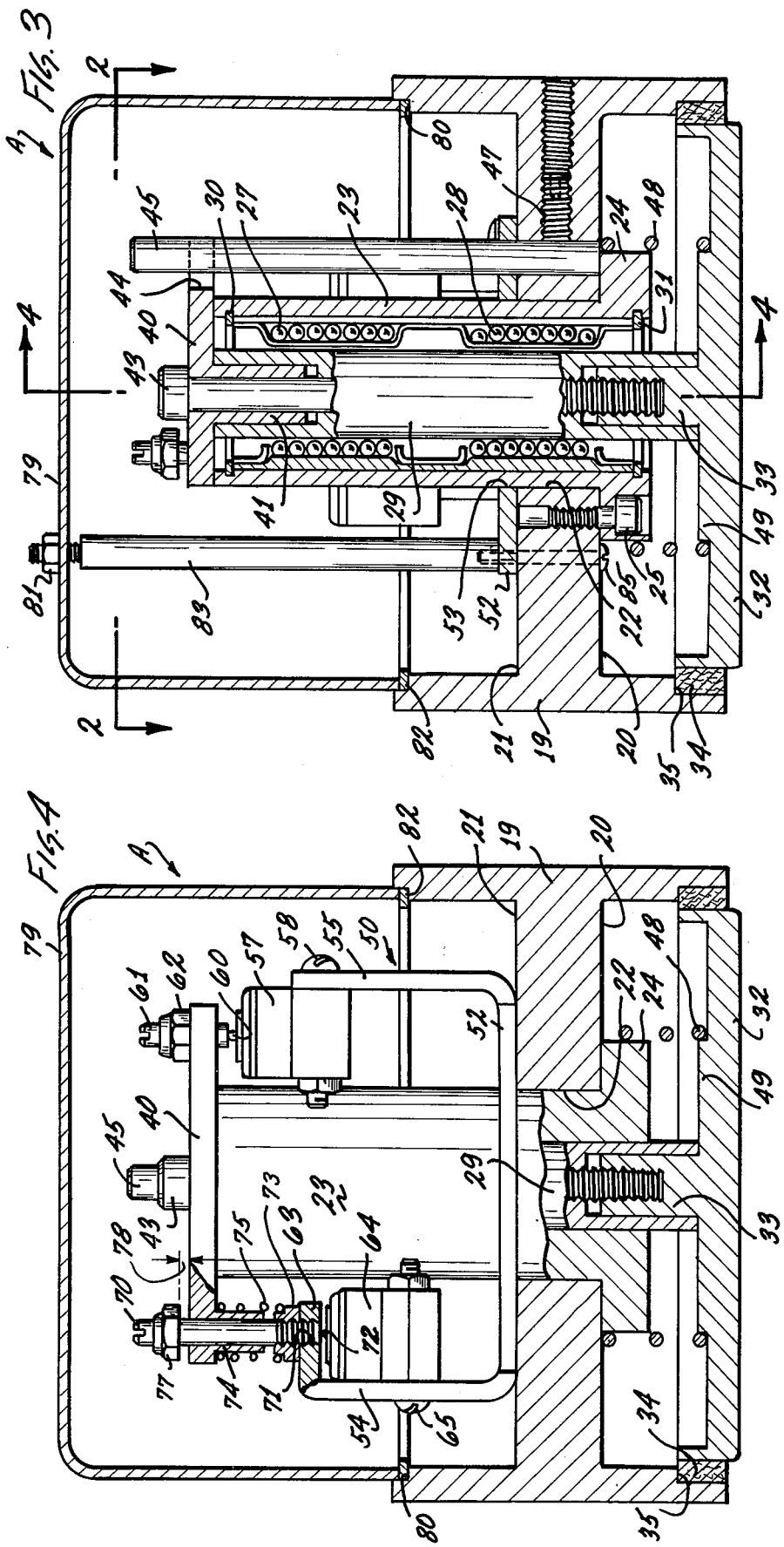

TOOL LENGTH COMPENSATOR FOR NUMERICALLY CONTROLLED MACHINE

BACKGROUND OF THE INVENTION

In the past, it has been the practice in setting up a numerically controlled machine, either (a) to manually adjust in its tool holder the axial position of each of the tools used by the machine, or (b) to first insert each tool in its tool holder in loosely held position, then to advance each tool against a stop located at a selected zero position to move the tool to adjusted position in its tool holder, and then to tighten each tool individually.

SUMMARY OF THE INVENTION

The present invention provides a tool length compensator for a numerically controlled machine of the type which uses a plurality of tools in selected succession, and which is provided with computer control mechanism which programs the performance of each of the tools as required. It is necessary in such N.C. machine that the computer be programmed to operate each tool from a selected zero position. To properly define such zero position, a target element is mounted for engagement by each tool as the latter is advanced, under the control of the machine's computer mechanism, along a selected line, and the target element arranged, upon engagement by each tool, to actuate in sequence two micro-switches.

Actuation of the first micro-switch causes the computer mechanism to slow the advance of the tool, while actuation of the second arrests further advance of the tool and notifies the computer that that particular tool is in "zero" adjusted position, from which position all future operational performance of the tool is programmed.

BRIEF DESCRIPTION OF THE DRAWINGS

The objectives and advantages of the invention will be apparent from the following description and the accompanying drawings wherein:

FIG. 3 is a sectional view taken along line 3—3 of FIG. 2.

FIG. 4 is a sectional view taken along line 4—4 of FIG. 3.

FIG. 5 is a wiring diagram showing a circuit for connecting the illustrative embodiment of the invention to the computer of a N.C. machine.

FIG. 6 is a diagram illustrating the operation of the illustrative embodiment of the invention.

DETAILED DESCRIPTION OF THE DRAWINGS

Figure 1:
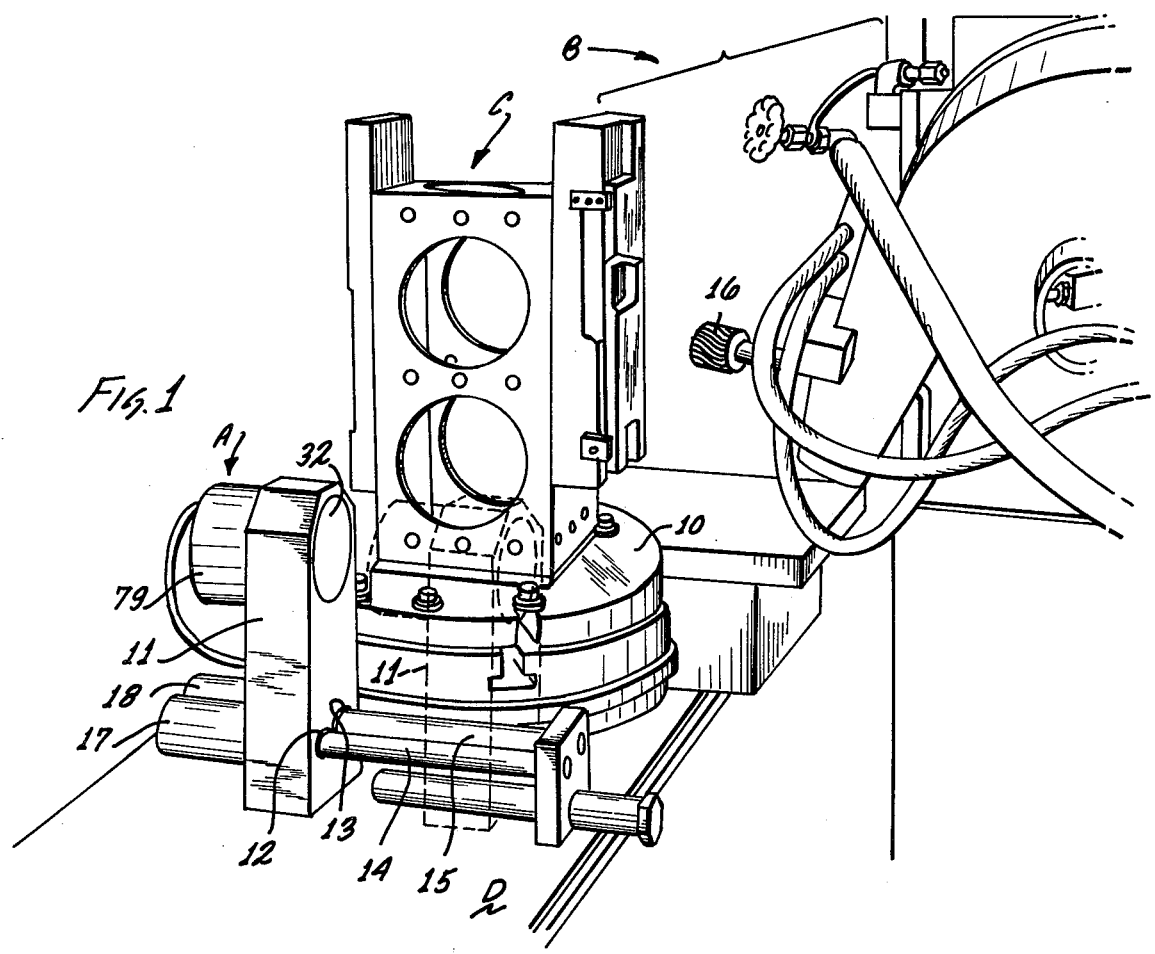
FIG. 1 is a fragmentary, perspective view showing portions of a N.C. machine set up for practicing the present invention, wherein each of the tools of said machine is to be programmed for one or more designated series of operations on a work piece which is shown mounted on the machine.

Referring to the drawings in detail, a tool length compensator A embodying the invention is mounted on a numerically controlled milling machine B, see FIG. 1, having a work piece C set up on the turret 10 of the machine. As illustrated, the compensator A is mounted in a support standard 11 having a pair of axial ball bearings 12 and 13 fitted into axially parallel holes provided in the lower end of the standard 11. The ball bearings 12 and 13 ride on a pair of parallel, hardened steel track rods 14 and 15, respectively, which are mounted on the usual carriage D of the machine B for movement parallel to the path of advance and retraction of each of a selected plurality of tools, such as the tool 16 in FIG. 1, mounted in the usual tool holders, not shown, of the machine B. A pair of hydraulic cylinders 17 and 18 are mounted to move the standard 11 and the compensator A mounted thereon between a selected, retracted position as indicated in solid lines in FIG. 1, and an advanced, operative position as indicated in broken lines in the same figure.

Figure 2:
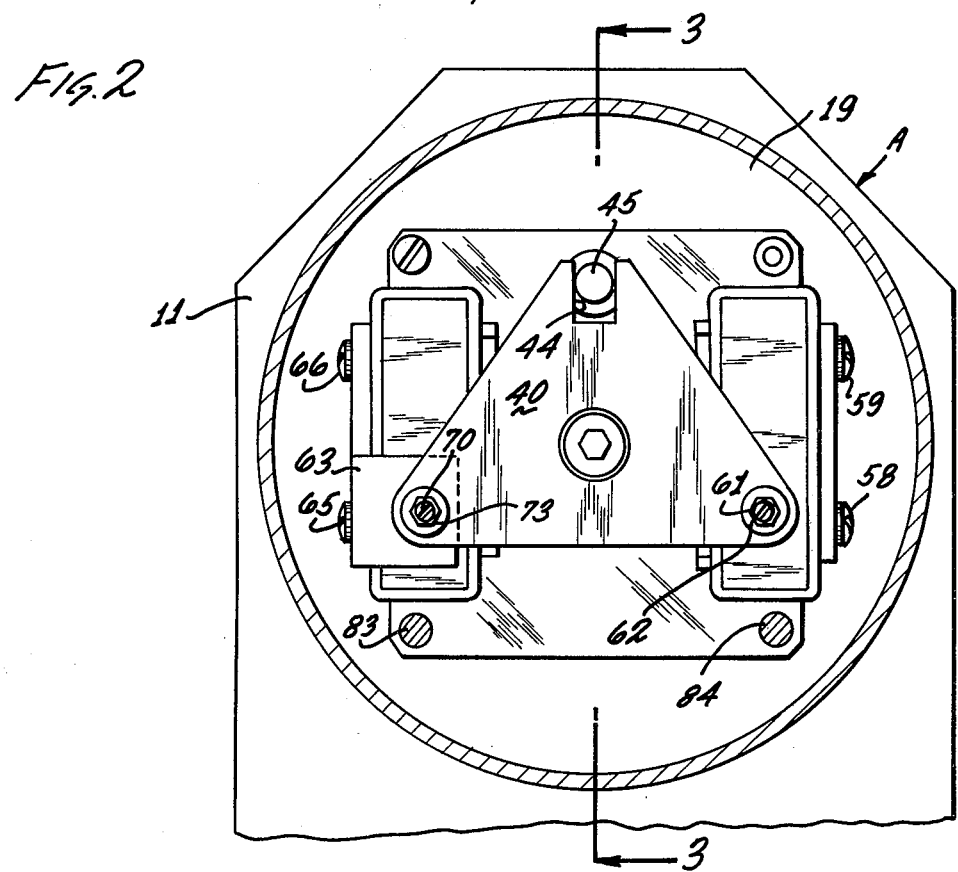
FIG. 2 is a transverse sectional view of an illustrative embodiment of a mechanism embodying the invention taken along line 2—2 of FIG. 3.

The compensator A comprises an annular frame 19, see FIGS. 2–4, of circular cross-sectional shape and of suitable material, for example, hard plastic, steel, or aluminum. Axial recesses 20 and 21 are provided in opposite ends of the frame 19, and an axial hole 22 connects these recesses. A headed, tubular guide member 23 is fitted co-axially into the hole 22, and the head 24 of this guide member is seated on the bottom of the recess 21 and is secured thereto by one or more screws 25, see FIG. 3. A pair of axial ball bearings 27 and 28, see FIG. 3, mounted in the bore of the tubular guide member 23, provide bearing support for axial movement of a tubular stem member 29 mounted co-axially in the bore of the tubular guide member 23. These bearings 27 and 28 are retained by a pair of conventional snap rings 30 and 31, biased into grooves provided one adjacent each end of the bore of the guide member 23.

A circular target plate 32 for engagement by each advancing tool of the N.C. machine for which the invention is intended, has a hub portion 33, which is fitted into an axial counterbore provided in one end of the tubular stem member 29. A dust sealing ring 34 of felt, plastic foam or other suitable material is provided in the annular space between the target plate 32 and the frame 19, and is retained in a seat 35 by suitable means, such as an adhesive.

A generally triangular plate 40 has a hub portion 41 generally similar to the hub 33 of the target plate 32, which hub 41 is fitted into a second counterbore provided in the other end of the stem member 29. An axial retaining screw 43 is inserted through a hole provided in the triangular plate axially of its hub 41 and axially through the bore of the tubular guide member 23 and is screwed into a threaded axial hole provided in the hub 33 of the target 32, with its head bearing on the triangular plate 32 to draw the hubs of the two plates 32 and 40 securely into their respective counterbores.

The triangular plate 40, see FIG. 2, has a notch 44 in one apex thereof, the sides of which notch are parallel and ride on a guide pin 45, one end of which is fitted into a hole provided therefor in the frame 19, see FIG. 3, and is secured therein by a set screw 47.

A light coil spring 48 is mounted in compression between the frame 19 and the target plate 32, with one end thereof fitted around a slightly raised portion 49 on the inner surface of the target plate 32, and its other end fitted around the head of the axial guide member 23. This coil spring 48 exerts a selected, axially outward bias on the target plate 32, normally to retain the triangular plate 40 in contact with its end of the axial guide member 23.

A micro-switch support member 50 comprises a generally rectangular base portion 52, see FIG. 3, having a positioning hole 53 therein to receive the axial guide member 23. A pair of micro-switch support arms 54 and 55, integral with the base portion 52, are bent at right angles to a position parallel to the axis of the tubular guide member, see FIG. 4. Upon the arm 55 a first micro-switch 57 is mounted by bolts 58 and 59 with its actuating pin 60 in axial register with the end of an actuating screw 61, which is screwed into a threaded hole in a second apex of the triangular plate 40.

A lock nut 62 secures the screw 61 in adjusted position, so that with the target plate 32 biased by the spring 48 to bring the triangular plate 40 into arresting contact with the axial guide member 23, the first micro-switch 57 will be just barely actuated. Then, upon initial engagement of the target plate 32 by an advancing tool of the N.C. machine B, the first micro-switch 57 will be actuated to slow the advance of such tool.

A free end tab 63, see FIGS. 2 and 4, of the support arm 54 is bent at right angles to overlie a second micro-switch 64, which is secured to the arm 54 by bolts 65 and 66. The actuating pin 70, see FIG. 4, of this second micro-switch is axially aligned with a hole 71 in the tab 63, into which the hole extends, free for axial movement therein, the threaded end portion of a second micro-switch actuating pin 72. A nut 73, screwed onto said threaded end of the actuating pin 72, is adjusted to limit axial movement of the pin 72 into the hole 71 to a position where it just holds the second micro-switch 64 in actuated condition. The intermediate portion of the actuating in 72 is unthreaded, and is mounted for axial slidable movement in the bore of a drilled boss 74, see FIG. 4, which is integral with the third apex portion of the triangular plate 40.

A coil spring 75 surrounds the boss 74 and is held in compression between the triangular plate 40 and the nut 73 to urge the latter toward the tab 63. A second nut 77 of self-locking type is screwed onto the threaded other end of the switch actuating pin 72, and is adjusted to have a selected clearance 78 from the triangular plate 40 when the latter is seated on the end of the axial guide member 23. This clearance 78 determines the distance the triangular plate 40, and the target plate 32 to which it is connected, will move before the nut 77 is engaged to thereby release the second micro-switch.

A cup-shaped cover 79 encloses the mechanism mounted in the recess 21, and is seated on a gasket 82 in a seat 80 provided in the frame 19. The cover 79 is retained in position by nuts 81, see FIG. 3, one of which is screwed onto threaded extension of each of a pair of cover retaining posts 83 and 84, see FIG. 2. The posts 83 and 84 are retained in position by screws 85, see FIG. 3, which are inserted through aligned holes in the frame 19 and base portion 52 and are screwed into threaded axial holes in the posts.

An illustrative but presently preferred circuit 86 of the tool length compensator A which embodies the present invention is shown in FIG. 5 with both micro-switches 57 and 64 held in their actuated, solid line positions by their respective actuating pins 60 and 72, see FIG. 4.

The micro-switches 57 and 64 may be wired into the computer circuit which controls the operation of the N.C. machine in any one of several ways, as will be understood by one familiar with such machines. A presently preferred arrangement is shown in FIG. 5, wherein the two micro-switches 57 and 64 are arranged as follows:

A command conductor 87 of the computer circuit of the N.C. machine A is connected to the switch arm terminal 88 of the second micro-switch 64. A second conductor 89 connects the terminal 90 of the second micro-switch 64 to the switch arm terminal 91 of the first micro-switch 57. A conductor 90 connects terminal 88 of the first micro-switch 57 to one side of a conventional flip-flop circuit 92, whence the latter circuit 92 is connected by a conductor 95 to a conductor 86 of the computer circuit of the machine B, which circuit may be of a suitable or well known type, not otherwise shown.

When first micro-switch 57 is released to its broken line condition of FIG. 5, the circuit to conductor 90 is opened, and another circuit is competed from command conductor 87 to the conductor 93 leading to the opposite side of the flip-flop circuit 92, thereby to notify the computer circuit conductor 86 of the machine B to slow the advance of a tool being processed in accordance with the invention.

Further slow advance of such tool causes the triangular plate 40 to engage the nut 77 and thereby release the second micro-switch 64, thereby opening the circuit to conductor 89 and restoring it to the conductor 90, which returns the flip-flop circuit 92 to its original condition discussed previously herein, and thus tranmits the necessary further signal from the command conductor 87 to the computer circuit conductor 86 of the N.C. machine, which arrests the tool being processed and notifies the computer that the tool is in zero adjusted condition, from which condition all further operations of the tool are programmed.

The tool being processed is then automatically retracted to a computer-selected position, which retraction restores the micro-switches 57 and 64 to their actuated positions. FIG. 6 diagrammatically depicts the action upon the micro-switches 57 and 64 of the advance and subsequent retraction of each tool, as will be understood without further explanation by one familiar with the circuitry and operation of N.C. machines.

OPERATION OF THE ILLUSTRATED FORM OF THE INVENTION

Assume that the N.C. machine B of FIG. 1 has, for example, a selected, usual plurality of tools mounted therein for use in performing a plurality of successive, programmed operations on the work piece C of FIG. 1, and that the work piece has been set up in accordance with required procedure for having such successive operations performed thereon. Each of the usual tools to be employed by the machine B, only the one 16 of which is illustrated, are mounted in their respective tool holders, and the tool holders are tightened in a well known manner to grip their respective tools.

The machine B is then actuated by a selected signal to its computer mechanism to align a first tool to be processed with the target plate 32, and the tool length compensator A also is moved to a selected operative position, for example, to its broken line position of FIG. 1. Upon a further signal to the computer by the operator of the machine B, such first tool is then advanced at high speed, under the control of the computer of the machine B, into engagement with the target plate 32, thereby to move the triangular plate 40 upwardly as shown in FIG. 4 to actuate the first micro-switch 57, which, as explained previously herein, slows the advance of such tool.

Upon the further slow advance of the tool by the distanced 78, see FIG. 4, the plate 40 engages the nut 77 to release the second micro-switch 64, which action transmits a second signal, via the flip-flop circuit 92, to the computer circuit conductor 86, which causes the computer circuit to arrest further advance of the tool being processed, and simultaneously to notify the computer of the machine B that said first tool is in its zero adjusted position.

The remaining tools of the N.C. machine then are each processed in a similar manner, upon the completion of which processing the machine B is set up and ready to proceed with its programmed operations on the work piece C.

The invention provides a simple, inexpensive and accurate mechanism and method for quickly and easily setting up a numerical control machine for operation, and one which insures that all of the tools of the machine will be adjusted to their respective zero conditions within very close tolerances.

What is claimed to be new and useful and desired to become U.S. Letters Patent is:

1. A tool length compensator for a numerically controlled machine having a plurality of tools mounted therein for performing, in sequence, and under the control of a computer, work operations upon a work piece secured in adjusted position in such machine, said compensator comprising:
    a frame mounted in selected position on the N.C. machine,
    a tool engaging member carried by said frame and movable along a selected path of advance of each of the tools of such N.C. machine,
    means resiliently biasing said tool engaging member against a stop in the direction counter to such selected path of tool advance.
    a first micro-switch supported by said frame and being actuated by said tool engaging member upon a selected movement of said tool engaging member in a direction opposite to the resilient bias of said tool engaging member, said first micro-switch being operatively embodied in a circuit of the computer controlling the N.C. machine for slowing the rate of advance of a tool of the N.C. machine moving along such path of advance and
    a second micro-switch supported by said frame and being actuated by said tool engaging member upon a further movement of said tool engaging member a selected distance beyond the point at which said tool engaging member actuates said first micro-switch, said second micro-switch being also operatively embodied in such circuit of the computer controlling the N.C. machine for arresting further advance of such tool and notifying the computer that such tool is in its zero position of adjustment, from which position all operative movements of the tool upon such workpiece are computed.

2. A tool length compensator as claimed in claim 1, wherein the frame is annular, with a co-axial annular recess in each end thereof, and an axial hole interconnects the recesses, the tool engaging member comprises a stem portion mounted for axial movement in the hole interconnecting such recesses, and an annular plate is mounted on the end of the stem which is directed oppositely to the direction of tool advance along such path, and means mounted on the other end of the stem and controlling the successive actuation of the two micro-switches.

3. A tool length compensator as claimed in claim 2, wherein the means mounted on the other end of said stem portion comprises a second plate mounted normal to the axis of the stem portion, the two micro-switches are fixedly mounted to said frame and are spaced from the second plate, a first actuating element carried by the second plate operatively interconnects the second plate to the first micro-switch for actuation of the latter upon a selected movement of the tool engaging member against its bias, and a second actuating element is mounted to the frame with selected clearance from said second plate for engagement by the latter upon a further movement of the tool engaging member beyond the point at which said tool engaging member actuates said first micro-switch.

4. A tool length compensator as claimed in claim 3, wherein a tubular guide member is fitted co-axially into the hole interconnecting the two frame recesses, and is secured therein, and said stem portion is mounted for axial movement in the bore of said tubular guide member.

5. A tool length compensator as claimed in claim 4, wherein axial ball bearing means is provided in the bore of the tubular guide member for ball bearing support of the stem portion.

6. A tool length compensator as claimed in claim 5, wherein the first plate member is mounted for axial movement in the frame recess in the end of the frame directed oppositely to such path of tool advance.

7. A tool length compensator as claimed in claim 6, wherein the first plate is spaced radially from the side of the recess in which it is mounted, and a dust seal is mounted in the space between said first plate and the frame surrounding such recess.

8. A tool length compensator as claimed in claim 7, wherein a cup shaped shell has its open end fitted to the other recess, and said shell encloses and shields the two micro-switches and their actuating mechanism.

9. A tool length compensator as claimed in claim 1, wherein the frame is mounted in a support, the support is mounted for reciprocating movement along a path parallel to such path of tool advance between a selected advanced position and a selected retracted position, and controlled power actuated means selectively moves the frame with the compensator mounted therein between such retracted and advanced positions.

10. A tool length compensator as claimed in claim 9, wherein the compensator support comprises a standard mounted for movement along track means parallel to such path of tool advance.

11. A tool length compensator as claimed in claim 10, wherein the track means comprises a pair of steel rods mounted to a fixed element of the N.C. machine, and the compensator support is provided with pair of axial ball bearings fitted for ball bearing movement lengthwise along said track rods.

12. A tool length compensator as claimed in claim 9 wherein the power actuated means comprises a pressurized fluid actuated cylinder, one end of which cylinder is secured to a fixed element of the N.C. machine, and the other end thereof is attached to the compensator support.

\* \* \* \* \*